United States Patent [19]

Kuwata et al.

[11] 4,290,337
[45] Sep. 22, 1981

[54] FASTENER SET

[75] Inventors: Takeo Kuwata, Fukumachi; Shoji Shimada, Kitakyushu; Mikio Usa, Nakama, all of Japan

[73] Assignee: Nittetsu Bolten Kabushiki Kaisha, Yukuashi, Japan

[21] Appl. No.: 933,601

[22] Filed: Aug. 14, 1978

Related U.S. Application Data

[63] Continuation of Ser. No. 756,344, Jan. 3, 1977, abandoned.

[51] Int. Cl.³ .............................................. F16B 31/02
[52] U.S. Cl. ...................................... 411/2; 252/56 S; 411/368; 411/903
[58] Field of Search .................. 85/61, 32 R, 1 C, 45; 29/446, 452; 252/56 S

[56] References Cited

U.S. PATENT DOCUMENTS

| | | | |
|---|---|---|---|
| 2,928,302 | 3/1960 | Owen et al. | 85/61 X |
| 3,138,987 | 6/1964 | Wing | 85/61 |
| 3,144,803 | 8/1964 | Briles | 85/32 R |
| 3,181,413 | 5/1965 | Wing | 85/61 X |
| 3,244,625 | 4/1966 | Silwones | 85/1 C X |
| 4,025,447 | 5/1977 | Mancini et al. | 252/56 S |
| 4,031,019 | 6/1977 | Bell | 252/56 S |

Primary Examiner—Ramon S. Britts
Attorney, Agent, or Firm—Stevens, Davis, Miller & Mosher

[57] ABSTRACT

A fastener set comprising a bolt body, a nut and a washer which are fitted onto the bolt body. Said bolt body has a notched portion which can be broken by a predetermined torsional force. Said nut is coated by a composition containing a ester obtained by only partial esterification of a polyol having not more than twelve carbon atoms and a fatty acid or an oxy-acid. The reaction force resulted from a fastening torque applied to the nut is transmitted to the bolt body so as to break off from the bolt body a surplus portion extending above the notched portion.

4 Claims, 6 Drawing Figures

FASTENER SET

This is a continuation of application Ser. No. 756,344 filed Jan. 3, 1977, now abandoned.

The present invention relates to a fastener set composed of a bolt, a nut and a washer capable of obtaining a desired axial force particularly at the time of fastening the bolt with the nut.

The relation between the fastening torque value (T), the torque coefficient (K), the fastening axial force (N), and the basic dimension (D) of the outside diameter of the bolt thread can be generally expressed in an equation as follows:

$$K = T/ND \text{ or } N = T/KD$$

The fastening of the bolt has been conventionally carried out by the hydraulic fastening device or a fastening device such as torque or impact wrench which can be adjusted to a fastening torque corrsponding to the torque coefficient so as to obtain a desired axial force. However, these fastening devices are different in their fastening torques even if they are of same type, since, they have been caused to be non-uniform in their fastening torques when a change is caused, for example, in their hydraulic or air pressure, to thereby make it necessary to adjust and check them prior to the fastening operation and also to check their fastening torques after the fastening operation. Therefore, when their fastening operation is undertaken at a height or under bad weather, the troublesome adjusting and checking work has especially become an obstacle to the fastening operation. After the fastening operation, it can not be judged from the appearance of the bolt whether the desired axial force has been applied to the bolt or not, which has been liable to lead to such a fatal mistake that the bolt is left not fastened.

Accordingly, there has been needed such a fastener set wherein a certain axial force can be automatically obtained without necessity of adjusting and checking the fastening torques of the fastening devices and which can make the fastening operation extremely simple, and furthermore can attain a high accuracy in the fastening of the bolt.

To meet this need, there has been developed a bolt which is provided with a notch and a surplus portion, said surplus portion being broken off from the bolt by a predetermined torsional force in a manner that the reaction force due to the fastening torque applied to the nut which is fitted onto the bolt is transmitted to the surplus portion. However, this bolt is not satisfactory for attaining the predetermined axial force which is intended to obtain. Namely, as apparent from the equation $N = T/KD$, a change in the torque coefficient (K) is caused to bring a change to the fastening axial force (N) even if the fastening torque value (T) is limited to a certain value at the time when the bolt is produced. For example, after the notched portion of the bolt is broken, said bolt can not be further fastened by the same fastening device even when the predetermined axial force is not still applied to the bolt due to the interrelation with the torque coefficient. On the contrary, when the torque coefficient is low, a fastening axial force higher than the predetermined one is applied to the bolt before its notched portion is broken, thus sometimes resulting in an extreme case where the bolt itself is extended or broken off by the over tightening beyond the required axial force.

Therefore, for the purpose of adjusting the torque coefficient, there has been conventionally employed such a surface lubrication treatment is applied to one or more of the bolt, the nut and the washer. In order to control the torque coefficient it is efficient to make the surface treatment on the nut, because both of the friction faces in the treated portion between the bolt and the nut, which they are in contact with each other (i.e., the screw surfaces), and those between the nut and the washer or the nut and the connected parts, at which they are also in contact with each other, can be controlled. Conventional surface treatments include zinc phosphate treatment-fatty acid soap treatment, and zinc phosphate treatment-rapeseed oil treatment, but these have had such a drawback that attention must be paid to the change in the torque coefficient which is caused corresponding to the lapse of time and the change in atmospheric temperatures. Namely, as shown in Table I, which will be shown later, little change can be found inthe torque coefficient within the temperature range of 0°–20° C., but it becomes remarkable within the range of 20°–40° C. Further, the treatment by rapeseed oil causes airing to thereby degrade the coating effect.

Accordingly, at the sites of a steel-frame building or a bridge where the fastening of the frames is often carried out actually and it has been required to prevent the bolt from being over tightened to an excessive extent at high temperatures in summer or employing some other counter-measures in the course of the fastening operation, there has been needed a fastener set allowing a desired axial force to be obtained regardless of the lapse of time and the change in atmospheric temperatures at the time of the fastening operation.

Therefore, a primary object of the present invention is to provide a nut treated on its surface to keep a torque coefficient designed to obtain a desired fastening axial force and a bolt designed to obtain a fastening torque value calculated from the desired axial force and the designed torque coefficient.

Another object of the present invention is to provide a fastner set comprising a bolt, a nut and a washer, of which the torque coefficient is little changed by the atmospheric temperature at the time of the fastening operation and which has a high stability independent of the lapse of time and the change in atmospheric temperatures, said bolt having a bolt body and a surplus portion between which a notch is formed to be broken by a predetermined torsional force, said surplus portion being broken off from the bolt body by the reaction force resulting from the fastening torque applied to the nut which is fitted onto the bolt; and after the phosphatization or without being subjected to the phosphatization, said nut being coated by a solid oil lubricant comprising mainly a fatty acid ester, namely a composition of a partial ester obtained by esterification of a polyol having not more than twelve carbon atoms and a saturated or unsaturated fatty acid or a fatty acid which may have side chains, or aliphatic or aromatic oxi-acid, or a mixture of such a partial ester and a complete ester.

These and other objects as well as the merits of the present invention will be supported from the following detailed description with reference to the accompanying drawing.

Figure 1:
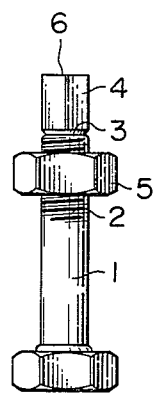
FIG. 1 is a front view showing an example of the fastener set according to the present invention.

In FIG. 1 which shows an example of the fastener set according to the present invention, adjacent the upper end of the threaded portion 2 of a bolt body 1 is formed a notch 3, above which extends a surplus portion 4. The notch 3 has such a depth as can be broken by the reaction force resulted from a predetermined fastening torque which is applied to the bolt body 1 and a nut 5 which is fitted onto the threaded portion 2 of the bolt body 1, and the shape and dimension of the notch 3 are designed to have a torsional resistance which is required to obtain the predetermined fastening torque.

Figure 2:
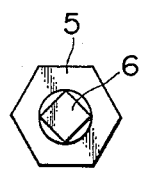
FIG. 2 is a plane view of the example shown in FIG. 1.

Although the length of the surplus portion 4 of the bolt body 1 is not limited to a particular value, it is necessary for the surplus portion 4 to have a length only allowing the clamping member of a fastening device to clamp it. As shown in FIG. 2, the surplus portion 4 is formed to have a section of a polygon or oblong, ellipse, or other suitable shapes except that of a circle so that the surplus portion 4 may be clamped by the fastening device. In the other embodiment of the invention, a recess 7 having such section of a polygon or oblong, ellipse, or other suitable shapes except that of a circle may be provided in the end surface 6 of the surplus portion 4, as shown in FIG. 3.

Figure 4:
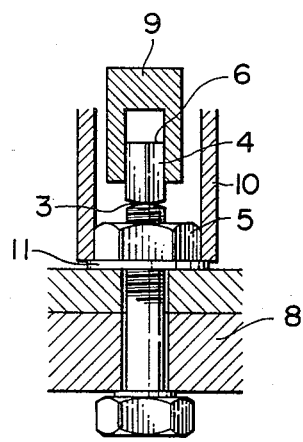
FIG. 4 is a vertically sectional view of the example shown in FIG. 1 showing how the fastener set is fastened.

After the nut 5 is fitted onto the threaded portion 2 of the bolt body 1 which has been inserted through connected parts 8 to be fastened, and further is rotated to the rung-tight condition, the clamping portion 9 of the bolt fastening device is fitted onto the surplus portion 4 of the bolt body 1 as shown in FIG. 4 while the nut rotating portion 10 of the bolt fastening device fitted onto the nut 5 is driven.

Figure 3:
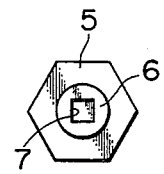
FIG. 3 is a plane view showing other example of the fastener set according to the present invention.

In case that such a recess 7 as shown in FIG. 3 is provided in the end surface 6 of the surplus portion 4 of the bolt body 1, the clamping portion 9 of the bolt fastening device is formed so as to fit into the recess 7.

In the fastening operation only the nut 5 is rotated against the surplus portion 4 held stationary by the clamping portion 9 of the fastening device and the reaction force caused in this nut rotating operation is transmitted through the clamping portion 9 to the surplus portion 4 so as to act as a torsional reaction force on the surplus portion 4.

After the phosphatization or without being subjected to the phosphatization, the nut 5 is coated, prior to the fastening operation, by a composition containing a partial ester obtained by esterification of a polyol having not more than twelve carbon atoms and a saturated or unsaturated fatty acid, or a fatty acid which may have side chains or aliphatic or aromatic oxy-acid, or a mixture of such a partial ester and a complete ester.

This coating of the nut 5 allows the change in the torque coefficient, which is caused corresponding to the atmospheric temperature at the time of the fastening operation, to be kept little as apparent from Table II which will be shown later.

As the polyol the following may be employed: ethylene glycol, propylene glycol, polyethylene glycol, polypropylene glycol, glycerine, alkyl glycerine, pentaerythritol, pentitole, mannitol, sorbitol, dipentaerythritol, ethylglycerol or the like.

As a fatty acid, which is partially esterified with these polyols there, may be used saturated fatty acid such as octylic acid, raulic acid, palmitic acid and stearic acid; unsaturated fatty acid such as oleic acid, linoleic acid and linolenic acid; fatty acid having side chains and being obtained from the splitting of wool fat; synthetic fatty acid having carbon number nine, twelve, fifteen, eight and sixteen; fatty acids obtained from the oxidation of hydrocarbons; mixed fatty acids obtained from the fat-splitting of natural fat; and mixtures of these natural and synthetic fatty acids. Instead these fatty acids may be used aliphatic or aromatic oxy-acids.

A certain amount of fatty acid, higher alcohol, hydrocarbon wax, oil-soluble high molecular compound, plasticizer, antioxidant, well-known extreme pressure agent, solvent or the like may be added and mixed.

The phosphatization of the nut is performed using secondary or tirtiary dimetalic phosphate such as iron phosphate, zinc phosphate or the like to thereby coat the nut uniformly in the thickness of 5–20 microns.

EXAMPLE 1

After the nut of the fastener set composed of a high strength bolt of F11T⅞", a nut and a washer was free from scale, it was treated by the phosphatization. After immersed in 5% emulsion liquid of the following composition, the nut was dried to form a film of coating thereon.

The coating composition consists of:

| | |
|---|---|
| mixture of partial ester of hydrogenated fish oil fatty acid and pentaerythritol (at the possible rate of monoester 25%, diester 40%, triester 30% and tetraester 5%) | 75% |
| polybutene (average molecular weight 4000) | 5% |
| dilauric phosphate | 10% |
| DOS (dioctylsebacate) | 5% |
| stearylethyleneoxide (HLB 10) | 5% |

When the nut thus coated was used, the relation between the torque coefficient and the temperature at the time of the fastening operation was as shown in Table II, which showed that the change in the torque coefficient was extremely less than that of the conventional surface treatment shown in Table I.

EXAMPLE 2

After the nut of the fastener set composed of a high strength bolt of F11T⅞", a nut and a washer was free from scale by the horning process, it was threaded.

The nut thus threaded was then immersed in 10% aqueous solution of the composition to form a film of coating thereon.

The coating composition consists of:

| | |
|---|---|
| solubitan tristearate | 50% |
| 1,2-hydroxystearic acid | 10% |
| alkylphenolic phosphate | 15% |
| alkylphenol polyethylene glycol (HLB 16) | 10% |
| dioctylphthalate | 13% |

| | |
|---|---|
| zinc dioctyldithiophosphate | 2% |

When the nut thus coated was used, the relation between the torque coefficient and the temperature at the time of the fastening operation was as shown in Table III.

Figure 5:
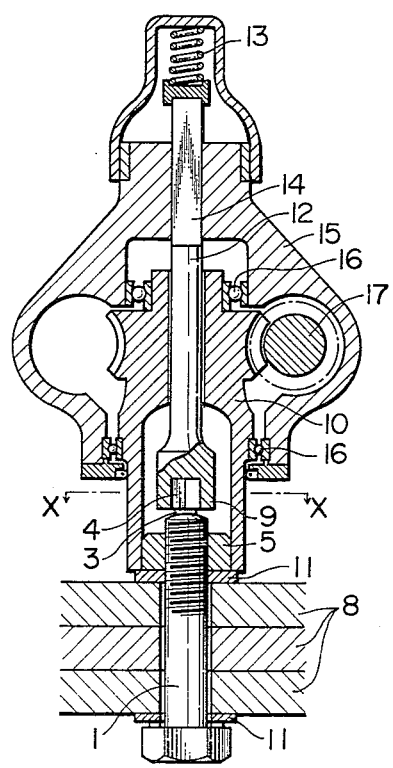
FIG. 5 is a sectional view showing an example of the fastening device used for fastening the fastener set according to the present invention.
Figure 6:
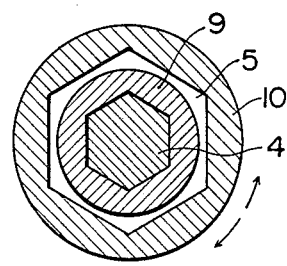
FIG. 6 is an enlarged sectional view taken along the line X—X in FIG. 5.

There will be now described an example of the bolt fastening device, which is used for fastening the fastener set according to the present invention, with reference to FIG. 5.

FIG. 5 shows the condition at which the bolt fastening device is fitted onto the surplus portion 4 of the bolt body 1 and the nut 5 which are attached through the washers 11 to the connected parts 8 to be fastened. In this case the clamping portion 9 attached to one end of a central shaft 12 is fitted onto the surplus portion 4 of the bolt body 1 while the nut releasing portion 10 is fitted onto the nut 5. To the other end of the central shaft 12 is attached a spring 13 so as to correspond to any change in the length of the surplus portion 4 of the bolt body 1 and to allow the central shaft 12 to be movable in the upper and the lower directions. A spline shaft 14 of multiangular section formed to the upper portion of the central shaft 12 is held by a casing 15 so as to be movable only in the axial direction. The casing 15 houses a driving means 17 such as hydraulic cylinder or an electric motor, and said driving means 17 is engaged through toothed wheels with the nut rotating portion 10 which is loosely attached to the central shaft 12 and freely rotatably held through ball bearings 16 in the casing 15. Therefore, when the nut rotating portion 10 is driven by the driving means 17, the reaction force required to rotate the nut 5 is transmitted through the driving means 17 and the casing 15 to the central shaft 12. Since the central shaft 12 is fixedly fitted onto the surplus portion 4 of the bolt body 1 through the clamping portion 9 provided at the lower end thereof, the reaction force transmitted to the bolt body 1 is absorbed by the bearing surface of bolt head and the friction between the washers 11 under the bolt head or connected parts 8 to be fastened, to thereby allow the nut 5 to be rotated holding the bolt body 1 stationary. When the reaction force reaches higher than the predetermined value, the surplus portion 4 is broken off at the notched portion 3 from the bolt body 1, thus finishing the fastening operation.

It will be understood from the above that when a certain axial force is applied to the bolt body 1 the surplus portion 4 thereof is automatically broken off because of the notched portion 3 provided between the bolt body 1 and the surplus portion 4 thereof and that the torque by which the nut 5 is rotated is therefore stabilized.

It will be also understood that because of the coating treatment of the nut, the nut rotating torque of the nut caused by the friction between the boltbody 1, the nut 5 and the washers 11, namely the torque coefficient can be stabilized regardless of atmospheric temperatures or conditions under which the fastening operation is carried out.

TABLE I

Fastener set comprising a washer, a nut and a bolt of F11T7/8″

| surface treatment | temp. at the fastening operation | 0° C. | 20° C. | 40° C. | 60° C. |
|---|---|---|---|---|---|
| zinc phosphate treatment-fatty acid soap treatment | average value of torque coefficient (K) | 0.124 | 0.118 | 0.102 | 0.101 |
| | standard deviation (σ) | 0.0045 | 0.0045 | 0.0024 | 0.0036 |
| zinc phosphate treatment-rapeseed oil treatment | average value of torque coefficient (K) | 0.137 | 0.134 | 0.125 | 0.116 |
| | standard deviation (σ) | 0.0025 | 0.0044 | 0.0052 | 0.0025 |

$$\overline{K} = \frac{\Sigma Ki}{n} \qquad \sigma = \sqrt{\frac{\Sigma(Ki - K)^2}{n}}$$

where
$n$ = number of the sets tested
$\overline{K}$ = average value torque coefficient
$Ki$ = individual value of torque coefficient

TABLE II

Example I

| temp. at the fastening operation | 0° C. | 20° C. | 40° C. | 60° C. | 80° C. |
|---|---|---|---|---|---|
| average value of torque coefficient (K) | 0.129 | 0.123 | 0.127 | 0.124 | 0.124 |
| standard deviation (σ) | 0.0041 | 0.0048 | 0.0038 | 0.0038 | 0.0036 |

TABLE III

Example II

| temp. at the fastening operation | 0° C. | 20° C. | 40° C. | 60° C. | 80° C. |
|---|---|---|---|---|---|
| average value of torque coefficient (K) | 0.130 | 0.127 | 0.126 | 0.124 | 0.122 |
| standard deviation (σ) | 0.0045 | 0.0058 | 0.0040 | 0.0035 | 0.0040 |

What is claimed is:

1. A fastener set comprising a bolt body having a thread and a nut threadably mounted on the bolt body, said bolt body having between the thread and adjacent end a notched portion which can be broken by a predetermined torsional force, and said nut, including its screw surfaces, being coated by a solid composition containing a partial ester obtained by only partial esterification of a polyol having not more than twelve carbon atoms and a fatty acid, wherein the reaction force resulting from a fastening torque applied to the nut which is fitted onto the threaded portion of the bolt body is transmitted to the bolt body so as to break off from the bolt body a surplus portion extending above the notched portion, so that a desired fastening axial force can be obtained by fitting the nut onto the threaded portion of the bolt body with a low rotating torque while keeping the torque coefficient at a constant.

2. A fastener set according to claim 1 wherein the nut is coated by the composition after the phosphatization.

3. A fastener set according to claim 1, wherein the entire nut is coated by said composition, whereby the torque coefficient is maintained substantially constant throughout changes in temperature or lapse of time.

4. A bolt and nut assembly comprising a bolt having a bolt body terminating at a first end integral with a head for grasping the bolt with a tool and terminating in an opposite end longitudinally spaced from the first end, a thread on said bolt body for threadably securing a nut thereto spaced from each of said ends, a nut threadably mounted on said body thread, a notch in said bolt body between said body thread and said opposite end of the bolt body which weakens the bolt body and adapts it to be severed under torque from that portion extending between the body thread and said opposite end, and a lubricating coating on one of the facing surfaces of the bolt body and nut of a lubricant comprising a partial ester obtained by only partial esterification of a polyol having not more than twelve carbon atoms and a fatty acid.

* * * * *